Patented Nov. 18, 1952

2,618,619

UNITED STATES PATENT OFFICE 2,618,619

ANACARDIC MATERIAL-PINE WOOD EXTRACT REACTION PRODUCT

Peter L. Rosamilia, Bloomfield, N. J., and Solomon Caplan, New York, N. Y., assignors to The Harvel Corporation, a corporation of New Jersey No Drawing. Application June 17, 1949, Serial No. 99,858

19 Claims. (Cl. 260—25)

1

This invention relates to novel compositions of matter and to methods for preparing them. It is directed to novel products prepared from liquid anacardic materials and solid pine wood pitches or resins commonly termed "Vinsol," and with or without the use of "reagents," which may be aldehydes or those containing a reactive methylene group. The following are examples given merely by way of illustration of said "reagents": aldehydes such as formaldehyde, furfuraldehyde, crotonaldehyde, acetaldehyde, glyoxal, acrolein, the polymers thereof such as paraformaldehyde, trioxane, polymerized glyoxal and polymerized acrolein and also other compounds containing a reactive methylene group such as hexamethylene tetramine.

The pine wood resins or pitches, commonly termed "Vinsol" are obtained from pine, are relatively cheap and are available on the market in large quantities. In general they are at least 75% insoluble in gasoline, at least 90% insoluble in petroleum ether, at least 50% soluble in boiling toluene and have a methoxy content of at least 3%. They are fairly high melting point resins whose melting points are in the approximate range of 200–260° F., whose acid numbers are in the approximate range of 85–110 and whose saponification numbers are in the approximate range of 120–150. The methoxy content is usually in the approximate range of 3–7%. The gasoline insolubility may be anywhere from 75% to maximum and the petroleum ether insolubility may be anywhere from 90% to maximum. A typical specimen of said Vinsol had the following characteristics: 86% insoluble in gasoline, 98% insoluble in petroleum ether, melting point 115° C., acid number 95, methoxy content 5–6%, saponification number 125–135 and more than 50% soluble in boiling toluene.

The liquid anacardic materials employed are cashew nut shell liquid and its liquid polymers, distillates of cashew nut shell liquid and their liquid polymers, which distillates have a boiling point of approximately 225° C. at 10 mm. of mercury pressure and residues of cashew nut shell liquid and their liquid polymers, which residues measure between 25–75% of the cashew nut shell liquid from which they were derived.

The cashew nut shell liquid may be the raw cashew nut shell liquid obtained by the solvent extraction of said liquid from the cashew nuts or by the extraction of said liquid from said nuts by the use of a hot cashew nut shell liquid bath as set forth in the U. S. patent to E. R. Hughes No. 2,058,456, of October 27, 1936, or it may be

2 the so-called treated cashew nut shell liquid obtained after the raw cashew nut shell liquid has been treated to reduce its vesicant action and to remove the naturally occurring metals therein as set forth in the patents to Harvey et al., No. 2,067,919 of January 19, 1937, and 2,128,247 of August 30, 1938, and copending U. S. application of Solomon Caplan, Ser. No. 4,695 filed January 27, 1948, now Patent 2,559,593 issued July 10, 1951, to which reference is hereby made, or it may be either the raw or treated cashew nut shell liquid which has been steam distilled or distilled under vacuum at about 500–600° F. to remove the more volatile constituents which measure up to 10% by weight of the liquid treated. It is preferred that the cashew nut shell liquid be of the substantially completely decarboxylated type and from which there has been removed the nitrogenous and metal components naturally occurring therein.

The distillates and residues from cashew nut shell liquid may be obtained by distilling cashew nut shell liquid. The preferable manner of obtaining these products is to distill the cashew nut shell liquid at elevated temperatures. In commercial production, the cashew nut shell liquid may be either gas or vapor and for example steam distilled preferably at between 600–700° F. or distilled under sub-atmospheric pressure conditions and preferably below about 50 mm. of mercury pressure and temperatures between about 400–700° F. When distilled under reduced pressure of about 50 mm. of mercury, we prefer to employ temperatures between about 525–700° F. and when distilled under reduced pressure of about 10 mm. of mercury we prefer to employ a temperature of about 450° F. By whatever method employed, the distillation is continued until the quantity by weight of the distillate is between about 25% to about 75% of the quantity by weight of the cashew nut shell liquid. The distillates thus obtained for the most part consist of a phenol having an unsaturated hydrocarbon substituent of 15 carbon atoms and having a boiling point of approximately 225° C. at 10 mm. of mercury pressure. Of these distillates we prefer to employ those produced by vacuum distillation, thus eliminating the use of steam or the like.

The liquid polymers of cashew nut shell liquid and said residues are generally produced by heating them usually in the presence of an acidic or alkaline catalyst, such as a mineral acid as for example hydrochloric, sulphuric acid, etc., or alkyl sulphate, diethyl sulphate, etc., or lime, sodium hydroxide, potassium hydroxide, etc.

The liquid polymers of the distillates of cashew nut shell liquid may be produced by heating with a mineral acid or alkyl sulphate, such as hydrofluoric, hydrochloric or sulphuric acid, etc. and diethyl sulphate.

The various liquid anacardic materials, however obtained, vary in consistency or viscosity from a thin, readily pourable liquid to a so-called "plastic solid" exhibiting cold flow, and being readily pourable at 300° F.

It is known that all of the aforesaid liquid anacardic materials may be converted to the solid state, that is, the state in which they exhibit no cold flow, by heating them in the presence of a catalyst such as sulphuric acid, diethyl sulphate, etc., except that when the distillates or liquid polymers thereof are used, hydrofluoric acid is the catalyst employed for converting them to the solid state. None of these solids can be converted back to the liquid state by heating them to any temperature up to 300° F.

According to this invention, the following are some examples of the novel compositions which may be provided:

A. Vinsol in combination with one or more of said liquid anacardic materials. A method which may be employed for the production of said products, is to heat a mixture of said Vinsol together with the liquid anacardic material in any desired proportion depending upon the properties required in the end product. For most purposes the ratio by weight of Vinsol to liquid anacardic material in said mixture is in the range of 1–10 to 10–1 and the temperature employed is in the range of 200–600° F. and in factory practice 225–400° F., whereby with or without the aid of an acidic or alkaline catalyst, a reaction takes place to provide a thickened homogeneous product. The time of maintaining said mix in said temperature range is at least 30 minutes and generally between one-half to 6 hours depending on the particular temperature employed, the size of the batch and the desired end product.

A specific type of Vinsol-liquid anacardic material product that has been found particularly useful is that produced by heating a mixture of one part by weight of Vinsol together with 0.1–1 part by weight of the liquid anacardic material in a temperature range of 200–600° F. and in factory practice 250–350° F. for a sufficient length of time to note an appreciable thickening of the mass at that temperature and so that a sample thereof when cooled to room temperature is a brittle button. For that purpose and particularly when cashew nut shell liquid, said residues or the liquid polymers thereof are employed as the liquid anacardic material, maintaining the mass within that temperature range for a period of about 1 to 2 hours is sufficient. However, when said distillates or the liquid polymers thereof are employed as the liquid anacardic material, an exceedingly greater period of heating in said temperature range is generally required. After the mass has become thickened at that temperature, it may be poured into shallow pans and cooled to room temperature at which temperature the mass is a solid which may be readily comminuted in factory practice to provide fine particles in the nature of a powder or dust, which particles are relatively hard when compared with the corresponding liquid anacardic material which has been polymerized to the solid state by heat alone and in the absence of the Vinsol and then comminuted, which particles are brittle but are not friable when compared with Vinsol, which particles will not mass to any objectionable degree or storage and which particles are fusible resins which on heating may be converted from the solid to the liquid state before a temperature of 300° F. is attained. This last characteristic is of particular significance because the solid polymers of said anacardic materials cannot be converted to the liquid state at a temperature even as high as 400° F.

B. The aforesaid Vinsol-liquid anacardic material combinations of A. may, either with or without the aid of an acidic or alkaline catalyst, be reacted with one or more of said "reagents" to provide resinous reaction products which in their final state are solid and substantially infusible. In commercial practice the ratio by weight of said Vinsol-liquid anacardic material to said "reagent" is usually in the range of 100–1 to 10–1 and the temperature employed is usually in the range of 250–350° F. In one of its more specific aspects said fine powder or dust may be physically combined with one of said "reagents" in the solid state, such as paraform or hexamethylene tetramine. Then this combination containing the required amount of said "reagent" may be heated to provide a solid resinous reaction product which in its end state is thermoset.

C. The Vinsol-liquid anacardic material combinations of A. may be halogenated or sulphurized. An example of halogenation is to heat the mass in order to liquify it and add chlorine thereto in successive small increments until the desired degree of chlorination is attained, which may be between 1–20% or higher, by weight. The sulphurization may be carried out by rendering alkaline the mass of Vinsol-liquid anacardic material by the addition of an aqueous solution of sodium hydroxide and adding thereto while the mass is in the liquid form, the desired quantity of sulphur, which may be in the form of free sulphur, sulphur chloride or an alkaline polysulphide. The mass is maintained at liquification temperature of the mass or somewhat higher, up to say 300–350° F. for about 1 to 2 hours and is then poured into pans and cooled to provide a sulphurized product having a sulphur content of 1%–20% or more by weight. The various halogenated or sulphurized products may also be reacted with one or more of said "reagents" and generally in the proportion by weight of 100–10 parts of the former to 1 part of the latter, and usually in the temperature range of 250-350° F.

D. One or more of said liquid anacardic materials may be reacted with one or more of said "reagents" under either acidic or alkaline conditions to provide either thermoplastic or thermosetting resins in their intermediate state. Then 10–1 parts by weight of Vinsol is added to 1–10 parts by weight of any of said reaction products and the mass is maintained at a temperature between 250–350° F. until the desired thickening takes place whereupon the mass may be cooled to provide a solid fusible product. By following this procedure it is possible to produce different types of products depending upon whether a thermoplastic or thermosetting reaction product has been combined with the Vinsol. A specific type of such product that has been found particularly useful has been that prepared by combining 1 part by weight of Vinsol with .1–1 part by weight of a resinous reaction product produced by reacting under either acidic or alkaline conditions, 1 mole of a liquid anacardic material with .1–1 mole of one of said "reagents." The resinous reaction products may be produced by heating in the temperature range of 150–250° F. The mixture of said resinous reaction product, preferably in the liquid state, and Vinsol, either with or without the aid of a catalyst, may be heated at 250–350° F. for a period of 1 to 2 hours then poured into pans and cooled to room temperature.

E. Vinsol may first be reacted with one or more of said "reagents" and then the resultant resinous reaction product may be combined with any one or a combination of two or more of the liquid or fusible products produced under A, B, C and D and/or with any one or a combination of two or more of said liquid anacardic materials. For one of the purposes of this invention the Vinsol is reacted with said "reagent" in the proportions of 1 mole of the former to .25–.34 of a mole of the latter by heating a mixture thereof in the temperature range of 205–250° F. for approximately ½ hour, which mass is then dehydrated under vacuum and to 1 part of the resin so obtained there is added .1–1 part of the liquid or fusible products of A, B, C, D and/or the liquid anacardic material and this mixture is then heated to a temperature of 250–350° F. until, when cooled to room temperature, a brittle button is obtained. Then the mass is poured into pans and cooled and at room temperature it is a solid.

The following examples are given merely by way of illustrating various products of this invention, with all parts being given by weight unless otherwise specified.

Example I 100 parts of Vinsol and 65 parts of residue (prepared by vacuum distillation of treated cashew nut shell liquid until 50% of distillate has been removed) were heated together for a period of about 1½ hours at 300° F. Then the mass which had thickened was poured into shallow pans and cooled overnight to room temperature. The resultant product was solid and known as product I, was pulverized and was a fusible resin having a melting point no greater than 170° F.

Example II 100 parts of Vinsol and 65 parts of treated cashew nut shell liquid were heated together for 2½ hours at 300° F. Then the mass which had thickened was poured into shallow pans and cooled overnight to room temperature. The resultant product was solid and known as product II, was pulverized and was a fusible resin whose melting point was no greater than 170° F.

Products I and II may be reacted with any of said "reagents" to provide either thermoplastic or thermosetting resins depending upon the proportion of said "reagent" employed in the reaction. These reaction products may be employed in the brake linings, clutch facings, etc. and other friction elements, in molding powders, grinding wheels, etc. Products I and II may also be dissolved in an organic solvent such as alcohol and employed as a shellac substitute.

A method which may be employed for the production of a friction element such as a brake lining is to place 90–110 parts of asbestos fibers to 10–30 parts of pulverized product I or II and 1–5 parts of hexamethylene tetramine into a doughmixer. The dry mass is agitated and mixed to uniformity. Then it is molded under heat of 250–350° F. and a pressure of 1000–3000 lbs. per square inch to produce sheets of required thickness which are later shaped and cut to required size.

If desired, said products I and II may be reacted with one or more of said "reagents" to provide dry, hard and infusible reactions products which may then be comminuted and these particles may be employed as discrete particles as friction augmenting components in brake linings.

Example III

1–5 parts of hexamethylene tetramine or paraformaldehyde were mixed with 100 parts of product I, product II or a combination of products I and II and this dry powdered mass was then heated to 300° F. for 1 hour to provide an infusible resinous reaction product, known as product III and may be pulverized.

Example IV 300 parts of a distillate of cashew nut shell liquid and 30 parts of formaldehyde dissolved in water were heated together in the presence of an acidic catalyst, for one hour at 205–215° F. The mass was then dehydrated under vacuum and to .5 parts thereof, known as DA, was added one part of Vinsol and the mix was heated to 300° F. for 1½ hours. Then it was poured into shallow pans and cooled to the solid state and may be pulverized and is known as product IV.

Example V 300 parts of treated cashew nut shell liquid and 15 parts of formaldehyde dissolved in water were heated together in the presence of an alkaline catalyst for ½ hour at 205–215° F. Then the mass was dehydrated under vacuum and .5 parts thereof were mixed with 1 part of Vinsol and this mix was heated for 1½ hours at 300° F., poured into shallow pans and cooled. This product, known as product V, may be pulverized.

Example VI 300 parts of residue (obtained by the steam distillation of treated cashew nut shell liquid with 45 parts of distillate recovered) and 7.5 parts of formaldehyde dissolved in water were heated together in the presence of an acidic catalyst for ½ hour. Then the mass was dehydrated under vacuum. 15 parts of the resultant mass were mixed with 1 part of Vinsol and the mix was heated to 300° F. for 1½ hours, then poured into shallow pans and cooled to room temperature and this product known as product VI was pulverized.

Example VII 300 parts of a distillate of cashew nut shell liquid produced by the steam distillation of cashew nut shell liquid was mixed with 96 parts of furfuraldehyde and a small amount of ammonia catalyst. The mix was heated to 300° F. for ½ hour; then the mass was dehydrated under vacuum and .5 parts thereof was mixed with 1 part of Vinsol and this mix heated to 300° F. for 1½ hours, then poured into shallow pans and cooled to room temperature and is product VII, which may be pulverized.

Example VIII 300 parts of treated cashew nut shell liquid, 24 parts of furfuraldehyde and a small amount of ammonia catalyst were heated together at 205–215° F. for ½ hour; then the mass was dehydrated under vacuum and 4.5 parts thereof was mixed with 100 parts Vinsol and this mixture heated for 1½ hours at 300° F. then poured into pans and cooled to room temperature and this product is known as product VIII, which may be pulverized.

Example IX 300 parts of residue (prepared by the vacuum distillation of cashew nut shell liquid and measuring 52% by weight of the cashew nut shell liquid) together with 48 parts of furfuraldehyde and a small amount of ammonia catalyst were heated together for a period of 1 hour at 300° F. Then the mass was dehydrated under vacuum and ½ part thereof was mixed with 1 part Vinsol and this mass was heated to 300° F. for 1½ hours, poured into pans and cooled. This is known as product IX and may be pulverized.

All of these products IV–IX may be converted from the solid to the liquid state by heating them to a temperature no greater than 200° F. They may also be used for the same purposes as products I and II as heretofore described.

Example X 100 parts of Vinsol together with 5–25 parts of furfuraldehyde were heated together for ½ hour at 300° F. When 25 parts of furfuraldehyde is employed in the aforesaid proportions, there is an excess of furfuraldehyde, however, an excess need not be used. In any case the resultant resinous reaction product, hereinafter known as product VF, is a thermoplastic resin. To 100 parts thereof were added 65 parts of a residue of cashew nut shell liquid, of the type set forth in Example VIII, and this mixture was heated to 300° F. for about 2 hours then the mass was poured into pans and cooled over night to room temperature and is known as product X, which may be pulverized.

Example XI

Following the same procedure as that set forth in Example X, except that 50 parts of treated cashew nut shell liquid were employed in the place of the 65 parts of residue, there was produced product XI which may be pulverized.

The Vinsol may be reacted with any of said reagents and in some cases the amount of "reagent" permissible may be less than in others depending upon the particular reagent used to provide either a thermoplastic or a thermosetting Vinsol-"reagent" reaction product in its intermediate or fusible state. That is, in either case the Vinsol-"reagent" reaction product is in the liquid state at a temperature of 300° F.

Products X and XI are all normally solid fusible resins which may be reacted with the various "reagents" herein set forth for the production of infusible resins. These products X and XI find the same uses as products I and II.

Example XII 100 parts of "fusible" Vinsol-"reagent" resin, such as VF of Example X together with 25 parts of the distillate-aldehyde reaction product such as DA of Example IV were heated together for 15 minutes at 300° F. This product may be poured into pans and cooled to room temperature and is product XII which is a solid resin which may be pulverized. When cured overnight at 300–350° F. it may be converted to the dry, hard, infusible state.

Example XIII

Employing the same procedure as that set forth in Example XII except that 50 parts of the cashew nut shell liquid–aldehyde reaction product known as CA was used in place of the 25 parts of DA to provide products similar to those of Example XII.

All of the novel products of this invention as exemplified by the various products thereof, illustrated in the foregoing examples, may be employed in a wide variety of fields examples of which are the field of friction elements such as brake linings, clutch facings and the like; molding powders; lamination; and rubber. More specifically, the various thermoplastic as well as the fusible or intermediate thermosetting resins of the present invention are the raw materials employed in those particular fields. In the brake lining field, for example, those various novel resinous reaction products with or without the addition of one of the "reagents" and generally hexamethylene tetramine is mixed with asbestos in the proportions of 10–30 parts of the former to 100 parts of the latter. When heated the amount of hexamethylene tetramine is sufficient so that the novel resin may be reacted therewith to convert it to the infusible state. The asbestos containing mixture is first cold mixed with or without the aid of a solvent which is later driven off and is then heated at a temperature of approximately 350° F. and under pressure, if desired, of 100–3000 lbs. per square inch to provide a friction element of superior quality and in which the novel resinous material therein acts essentially as a binder. In addition, these various reaction products in the thermoplastic or intermediate state may be combined with a rubbery material such as natural rubber, reclaimed rubber, polymers of chloroprene and butadiene, rubbery polymers of butadiene, rubbery copolymers of butadiene and styrene and rubber copolymers of butadiene and acrylonitrile. These novel products may be admixed with one or more of said rubbery materials in the proportions of 5–100 of the former to 100 parts of the rubbery material and the mixture may be milled and thereafter cured with the aid of appropriate vulcanizing agents.

We claim:

1. A resinous product obtained by heating together (I) a material selected from the group consisting of liquid and fusible organic reaction products of (a) a liquid anacardic material selected from the group consisting of cashew nut shell liquid, liquid polymers of cashew nut shell liquid, distillates of cashew nut shell liquid, said distillates having a boiling point of approximately 225° C. at 10 mm. of mercury pressure, liquid polymers of said distillates, residues of cashew nut shell liquid obtained by heating cashew nut shell liquid until the quantity by weight of said residues is between 25–75% by weight of the cashew nut shell liquid and liquid polymers of said residues, and (b) an agent containing a reactive methylene group, and (II) a material selected from the group consisting of (c) pine wood resin having an ethoxy content of at least 3% and being at least 70% insoluble in gasoline, at least 90% insoluble in petroleum ether and at least 50% soluble in boiling toluene, and (d) organic reaction products of (c) and (b), said products (d) being liquid at 300° F.

2. A resinous reaction product as defined in claim 1, with said agent selected from the group consisting of formaldehyde, furfuraldehyde, crotonaldehyde, acetaldehyde, glyoxal, acrolein, paraformaldehyde, trioxane, polymerized glyoxal, polymerized acrolein and hexamethylene tetramine.

3. A resinous product obtained by heating together (I) a material selected from the group consisting of liquid and fusible organic reaction products of (a) a liquid anacardic material selected from the group consisting of cashew nut shell liquid, liquid polymers of cashew nut shell liquid, distillates of cashew nut shell liquid, said distillates having a boiling point of approximately 225° C. at 10 mm. of mercury pressure, liquid polymers of said distillates, residues of cashew nut shell liquid obtained by heating cashew nut shell liquid until the quantity by weight of said residues is between 25–75% by weight of the cashew nut shell liquid and liquid polymers of said residues, and (b) an agent containing a reactive methylene group and (II) pine wood resin having an ethoxy content of at least 3% and being at least 70% insoluble in gasoline and at least 90% insoluble in petroleum ether and at least 50% soluble in boiling toluene.

4. A resinous product obtained by heating together (I) a material selected from the group consisting of liquid and fusible organic reaction products of (a) a liquid anacardic material selected from the group consisting of cashew nut shell liquid, liquid polymers of cashew nut shell liquid, distillates of cashew nut shell liquid, said distillates having a boiling point of approximately 225° C. at 10 mm. of mercury pressure, liquid polymers of said distillates, residues of cashew nut shell liquid obtained by heating cashew nut shell liquid until the quantity by weight of said residues is between 25–75% by weight of the cashew nut shell liquid and liquid polymers of said residues, and (b) an agent containing a reactive methylene group and (II) an organic reaction product of (b) and (c) pine wood resin having an ethoxy content of at least 3% and being at least 70% insoluble in gasoline, at least 90% insoluble in petroleum ether and at least 50% soluble in boiling toluene, said product (II) being liquid at 300° F.

5. A resinous product obtained by heating together (I) liquid organic reaction product of an agent containing a reactive methylene group and residue of cashew nut shell liquid, said residue obtained by heating cashew nut shell liquid until the quantity by weight of the residue measures 25–75% of the cashew nut shell liquid and (II) organic reaction product of pine wood resin having an ethoxy content of at least 3%, being at least 70% insoluble in gasoline, at least 90% insoluble in petroleum ether, and at least 50% soluble in boiling toluene, and an agent containing a reactive methylene group, said product (II) being liquid at 300° F., said agents selected from the group consisting of formaldehyde, furfuraldehyde, crotonaldehyde, acetaldehyde, glyoxal, acrolein, paraformaldehyde, trioxane, polymerized glyoxal, polymerized acrolein and hexamethylene tetramine.

6. A resinous product obtained by heating together (I) liquid organic reaction product of an agent containing a reactive methylene group and residue of cashew nut shell liquid, said residue obtained by heating cashew nut shell liquid until the quantity by weight of the residue measures 25–75% of the cashew nut shell liquid and (II) organic reaction product of pine wood resin having an ethoxy content of at least 3%, being at least 70% insoluble in gasoline, at least 90% insoluble in petroleum ether, and at least 50% soluble in boiling toluene, and an agent containing a reactive methylene group, the ratio by weight of (I) to (II) being in the range of .1–1 to 1–1, said product (II) being liquid at 300° F., said agents selected from the group consisting of formaldehyde, furfuraldehyde, crotonaldehyde, acetaldehyde, glyoxal, acrolein, paraformaldehyde, trioxane, polymerized glyoxal, polymerized acrolein and hexamethylene tetramine.

7. A resinous product obtained by heating together (I) liquid organic reaction product of an agent containing a reactive methylene group and liquid polymerized residue of cashew nut shell liquid, said residue obtained by heating cashew nut shell liquid until the quantity by weight of the residue measures 25–75% of the cashew nut shell liquid and (II) organic reaction product of pine wood resin having an ethoxy content of at least 3%, being at least 70% insoluble in gasoline, at least 90% insoluble in petroleum ether, and at least 50% soluble in boiling toluene, and an agent containing a reactive methylene group, said product (II) being liquid at 300° F., said agents selected from the group consisting of formaldehyde, furfuraldehyde, crotonaldehyde, acetaldehyde, glyoxal, acrolein, paraformaldehyde, trioxane, polymerized glyoxal, polymerized acrolein and hexamethylene tetramine.

8. A resinous product obtained by heating together (I) liquid organic reaction product of an agent containing a reactive methylene group and liquid polymerized residue of cashew nut shell liquid, said residue obtained by heating cashew nut shell liquid until the quantity by weight of the residue measures 25–75% of the cashew nut shell liquid and (II) organic reaction product of pine wood resin having an ethoxy content of at least 3%, being at least 70% insoluble in gasoline, at least 90% insoluble in petroleum ether, and at least 50% soluble in boiling toluene, and an agent containing a reactive methylene group, the ratio by weight of (I) to (II) being in the range of .1–1 to 1–1, said product (II) being liquid at 300° F., said agents selected from the group consisting of formaldehyde, furfuraldehyde, crotonaldehyde, acetaldehyde, glyoxal, paraformaldehyde, acrolein, trioxane, polymerized glyoxal, polymerized acrolein and hexamethylene tetramine.

9. A resinous product obtained by heating together (I) liquid organic reaction product of an agent containing a reactive methylene group and residue of cashew nut shell liquid, said residue obtained by heating cashew nut shell liquid until the quantity by weight of the residue measures 25–75% of the cashew nut shell liquid and (II) pine wood resin having an ethoxy content of at least 3%, being at least 70% insoluble in gasoline, at least 90% insoluble in petroleum ether, and at least 50% soluble in boiling toluene, said agent selected from the group consisting of formaldehyde, furfuraldehyde, crotonaldehyde, acetaldehyde, glyoxal, acrolein, paraformaldehyde, trioxane, polymerized glyoxal, polymerized acrolein and hexamethylene tetramine.

10. A resinous product obtained by heating together (I) liquid organic reaction product of an agent containing a reactive methylene group and residue of cashew nut shell liquid, said residue obtained by heating cashew nut shell liquid until the quantity by weight of the residue measures 25–75% of the cashew nut shell liquid and (II) pine wood resin having an ethoxy content of at least 3%, being at least 70% insoluble in gasoline, at least 90% insoluble in petroleum ether and at least 50% soluble in boiling toluene, the ratio by weight of (I) and (II) being in the range of 1–10 to 10–1, said agent selected from the group consisting of formaldehyde, furfuraldehyde, crotonaldehyde, acetaldehyde, glyoxal, acrolein, paraformaldehyde, trioxane, polymerized glyoxal, polymerized acrolein and hexamethylene tetramine.

11. A resinous product obtained by heating together (I) liquid organic reaction product of an agent containing a reactive methylene group and liquid polymerized residue of cashew nut shell liquid, said residue obtained by heating cashew nut shell liquid until the quantity by weight of the residue measures 25-75% of the cashew nut shell liquid and (II) pine wood resin having an ethoxy content of at least 3%, being at least 70% insoluble in gasoline, at least 90% insoluble in petroleum ether, and at least 50% soluble in boiling toluene, said agent selected from the group consisting of formaldehyde, furfuraldehyde, crotonaldehyde, acetaldehyde, glyoxal, acrolein, paraformaldehyde, trioxane, polymerized glyoxal, polymerized acrolein and hexamethylene tetramine.

12. A resinous product obtained by heating together (I) liquid organic reaction product of an agent containing a reactive methylene group and liquid polymerized residue of cashew nut shell liquid, said residue obtained by heating cashew nut shell liquid until the quantity by weight of the residue measures 25-75% of the cashew nut shell liquid and (II) pine wood resin having an ethoxy content of at least 3%, being at least 70% insoluble in gasoline, at least 90% insoluble in petroleum ether, and at least 50% soluble in boiling toluene, the ratio by weight of (I) to (II) being in the range of 1-10 to 10-1, said agent selected from the group consisting of formaldehyde, furfuraldehyde, crotonaldehyde, acetaldehyde, glyoxal, acrolein, paraformaldehyde, trioxane, polymerized glyoxal, polymerized acrolein and hexamethylene tetramine.

13. A resinous product obtained by heating together (I) liquid organic reaction product of an agent containing a reactive methylene group and liquid polymerized cashew nut shell liquid and (II) pine wood resin having an ethoxy content of at least 3%, being at least 70% insoluble in gasoline, at least 90% insoluble in petroleum ether, and at least 50% soluble in boiling toluene, said agent selected from the group consisting of formaldehyde, furfuraldehyde, crotonaldehyde, acetaldehyde, glyoxal, acrolein, paraformaldehyde, trioxane, polymerized glyoxal, polymerized acrolein and hexamethylene tetramine.

14. A resinous product obtained by heating together (I) liquid organic reaction product of an agent containing a reactive methylene group and liquid polymerized cashew nut shell liquid and (II) pine wood resin having an ethoxy content of at least 3%, being at least 70% insoluble in gasoline, at least 90% insoluble in petroleum ether, and at least 50% soluble in boiling toluene, the ratio by weight of (I) to (II) being in the range of 1-10 to 10-1, said agent selected from the group consisting of formaldehyde, furfuraldehyde, crotonaldehyde, acetaldehyde, glyoxal, acrolein, paraformaldehyde, trioxane, polymerized glyoxal, polymerized acrolein and hexamethylene tetramine.

15. A resinous product obtained by heating together (I) liquid organic reaction product of hexamethylene tetramine and residue of cashew nut shell liquid, said residue obtained by heating cashew nut shell liquid until the quantity by weight of the residue measures 25-75% of the cashew nut shell liquid and (II) organic reaction product of pine wood resin having an ethoxy content of at least 3%, being at least 70% insoluble in gasoline, at least 90% insoluble in petroleum ether, and at least 50% soluble in boiling toluene, and furfuraldehyde, said product (II) being liquid at 300° F.

16. A resinous product obtained by heating together (I) liquid organic reaction product of hexamethylene tetramine and liquid polymerized residue of cashew nut shell liquid, said residue obtained by heating cashew nut shell liquid until the quantity by weight of the residue measures 25-75% of the cashew nut shell liquid and (II) organic reaction product of pine wood resin having an ethoxy content of at least 3%, being at least 70% insoluble in gasoline, at least 90% insoluble in petroleum ether, and at least 50% soluble in boiling toluene, and furfuraldehyde, said product (II) being liquid at 300° F.

17. A resinous product obtained by heating together (I) liquid organic reaction product of hexamethylene tetramine and residue of cashew nut shell liquid, said residue obtained by heating cashew nut shell liquid until the quantity by weight of the residue measures 25-75% of the cashew nut shell liquid and (II) pine wood resin having an ethoxy content of at least 3%, being at least 70% insoluble in gasoline, at least 90% insoluble in petroleum ether, and at least 50% soluble in boiling toluene.

18. A resinous product obtained by heating together (I) liquid organic reaction product of hexamethylene tetramine and liquid polymerized residue of cashew nut shell liquid, said residue obtained by heating cashew nut shell liquid until the quantity by weight of the residue measures 25-75% of the cashew nut shell liquid and (II) pine wood resin having an ethoxy content of at least 3%, being at least 70% insoluble in gasoline, at least 90% insoluble in petroleum ether, and at least 50% soluble in boiling toluene.

19. A resinous product obtained by heating together (I) liquid organic reaction product of formaldehyde and liquid polymerized cashew nut shell liquid and (II) pine wood resin having an ethoxy content of at least 3%, being at least 70% insoluble in gasoline, and at least 90% insoluble in petroleum ether, and at least 50% soluble in boiling toluene.

PETER L. ROSAMILIA.
SOLOMON CAPLAN.

REFERENCES CITED

The following references are of record in the file of this patent:

UNITED STATES PATENTS

| Number | Name | Date |
| --- | --- | --- |
| 2,014,370 | Damitz | Sept. 17, 1935 |
| 2,165,140 | Harvey | July 4, 1939 |